United States Patent [19]
Carlson

[11] 4,154,397
[45] May 15, 1979

[54] NIGHT SET-BACK THERMOSTAT

[75] Inventor: Elmer A. Carlson, Agoura, Calif.

[73] Assignee: International Telephone and Telegraph Corporation, New York, N.Y.

[21] Appl. No.: 876,102

[22] Filed: Feb. 8, 1978

[51] Int. Cl.² ............................................ G05D 23/00
[52] U.S. Cl. .................................... 236/46 R; 236/47
[58] Field of Search .................. 236/47, 46 R; 165/12; 340/309.1

[56] References Cited
U.S. PATENT DOCUMENTS

| 3,964,676 | 6/1976 | Rooks et al. ......................... 236/47 X |
| 3,974,426 | 8/1976 | Gingras ................................ 236/47 X |
| 4,049,193 | 9/1977 | Haviland et al. ................... 236/47 X |
| 4,054,245 | 10/1977 | Bennetsen ............................. 236/47 |

Primary Examiner—William E. Wayner
Attorney, Agent, or Firm—A. Donald Stolzy

[57] ABSTRACT

A night set-back thermostat which may or may not be operable on a two-wire line with one or two series switches and with the possibility for provision of digital time, temperature or other storage and/or data entry or reentry apparatus therefor.

5 Claims, 15 Drawing Figures

NIGHT SET-BACK THERMOSTAT

BACKGROUND OF THE INVENTION

This invention relates to thermostats for use in controlling gas-fired devices or the like, and more particularly to a digital night set-back thermostat.

PRIOR ART STATEMENT

Night set-back thermostats utilizing two series switches with hysteresis are old in the art. However, these and other thermostats lack accuracy and do not operate on a two-wire line.

SUMMARY OF THE INVENTION

In accordance with the thermostat of the present invention, the above-described and other disadvantages of the prior art are overcome by providing a night set-back thermostat with time, temperature and other digital inputs which may be manually set or reset, if desired.

Further, if desired, the digital inputs may be powered on the single, self-same two-wire line on which one or two thermostatic switches may be operated.

BRIEF DESCRIPTION OF THE DRAWINGS

In the accompanying drawings which illustrate exemplary embodiments of the present invention.

DESCRIPTION OF THE PREFERRED EMBODIMENTS

The Embodiment of FIGS. 1-9

Figure 1:
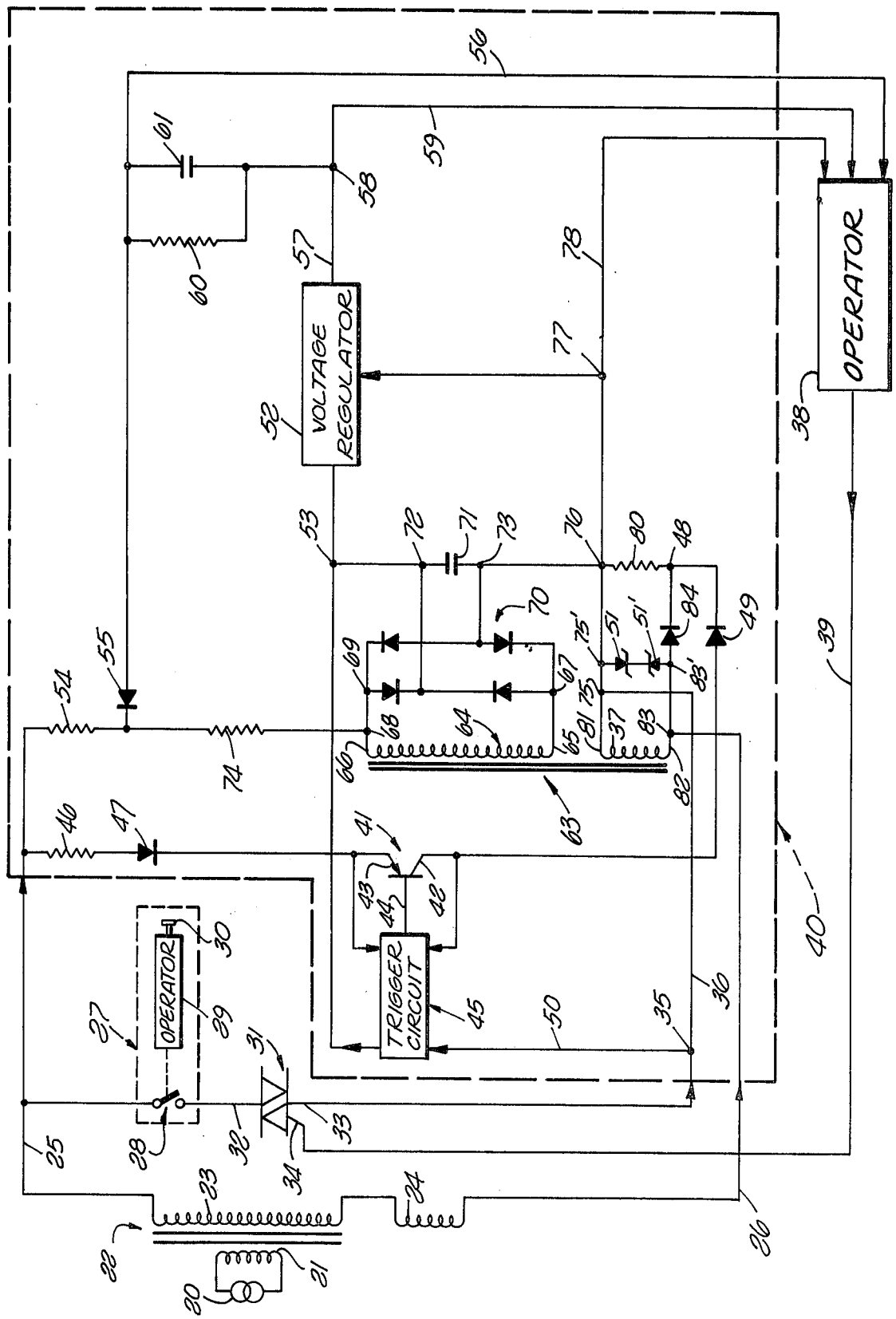
FIG. 1 is a schematic diagram of one embodiment of the present invention.

An A.C. source is shown at 20 in FIG. 1 connected to a primary 21 of a transformer 22 having a secondary 23. Secondary 23 and a main valve winding 24 are connected in series, respectively, from a lead 25 to a lead 26.

A high temperature thermostat is provided at 27 having a switch 28. Thermostat 27 has an operator 29 that closes and opens switch 28, and an adjustment knob 30. Thermostat 27 may be entirely conventional and employed to control the daytime temperature.

A triac 31 is provided with leads 32 and 33, and a gate 34. Triac 31 acts as a switch and is connected in series with switch 28 from lead 25 to lead 26 through a junction 35, a lead 36, and a transformer primary 37. Triac 31 is controlled by an operator 38 by a connection to gate 34 over a lead 39. An operator input circuit is provided at 40 which, in part, acts as a power supply for operator 38. A transistor 41 is provided which includes a collector 42, an emitter 43 and a base 44. Collector 42, emitter 43 and base 44 are all connected to a trigger circuit 45. A resistor 46 and a diode 47 are connected in that order from lead 25 to emitter 43. Diode 47 is poled to be conductive toward emitter 43.

A junction 48 is provided having a diode 49 connected from collector 42 to junction 48 and poled to be conductive toward junction 48.

Trigger circuit 45 has an input lead 50 connected from junction 35 and an output lead connected to a voltage regulator 52 through a junction 53.

Sixty cycle timing pulses are supplied by transformer 22 through a resistor 54 and a diode 55 to a lead 56. Voltage regulator 52 has an output lead 57 connected through a junction 58 to an input lead 59 to operator 38. A resistor 60 and a capacitor 61 are connected in parallel from junction 59 to lead 56.

Diode 55 is poled to be conductive toward a junction 62. Resistor 54 is connected from lead 25 to junction 62.

Primary 37 is a primary of a transformer 63 having a secondary 64 with output leads 65 and 66. Output lead 65 has a junction 67. Output lead 66 has junctions 68 and 69 connected thereto. A full wave rectifier is provided at 70 connected across a capacitor 71 at junctions 72 and 73. A resistor 74 is connected between junctions 62 and 68. Junctions 53 and 72 are connected together. A junction 73 is connected to four junctions 75, 75', 76 and 77. A lead 78 is connected from junction 77 to operator 38. Except for the clock input on lead 56 to operator 38, the leads 59 and 78 provide power to operator 38.

Figure 5:
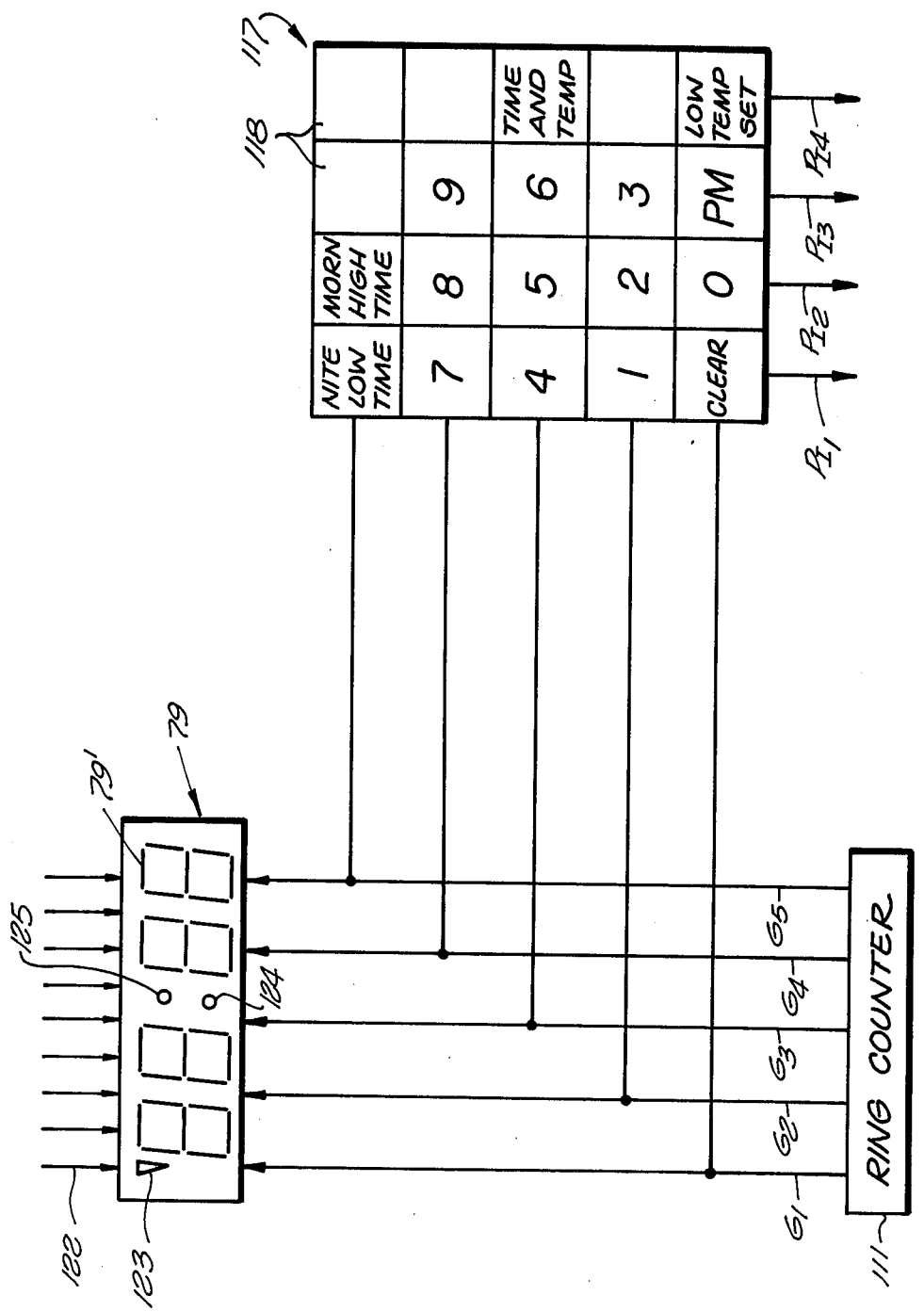
FIG. 5 is a diagrammatic view of a display, a ring counter, and a set of push buttons for setting certain operating conditions of the thermostat.

A display 79 shown in FIG. 5 including a heat anticipator 80 in FIG. 1 connected between junctions 48 and 76. Anticipator 80 is positioned in thermostat 27.

Primary 37 has an output lead 81 connected to junction 75, and an output lead 82 connected to a junction 83. A diode 84 is connected from junction 83 through a junction 83' to junction 48, and is poled to be conductive in a direction toward junction 48. Zener diodes 51 and 51' are poled in opposite directions and connected in a series circuit from junction 75' to junction 83'.

In the operation of the night set-back thermostat of FIG. 1, source 20 supplies A.C. power. Triac 31 is on during a predetermined time period from morning till night. During this period, thermostat 27 keeps the space to be heated at a predetermined high temperature set by knob 30. It is necessary to supply power to operator 38 all the time to operate triac 31 properly all the time. Thus, if lead 33 were connected directly to lead 26, the operator input circuit 40 would be connected across the short circuit of switch 28 and triac 31. Power is, however, supplied to operator 38 notwithstanding the closure of switch 28 by the operator input circuit 40. This is true because primary 37 is connected in series with switches 28 and 31. Secondary 64 through rectifier 70 thus maintains a D.C. voltage across capacitor 71 through voltage regulator 52 to operator 38 via lead 59.

When either one or both of the switches 28 and 31 are open, primary 37 is pulsed by trigger circuit 45. Transistor 41 is pulsed to saturation and then allowed to become cut off at an interval determined by trigger circuit 45. Trigger circuit 45 may be a relaxation oscillator of the RC type, if desired.

Note will be taken that the trigger circuit 45 keeps current flowing through heat anticipator 80 via diode 49. Trigger circuit 45 may effectively be short circuited when both the switches 28 and 31 are closed. In this case, anticpator 80 receives current through diode 84.

As will be explained, operator 38, when a predetermined time occurs, opens switch 31 and allows the temperature to fall to a predetermined low temperature. Triac 31 will then cycle the valve (winding 24) to maintain the heated space at the said predetermined low temperature.

Also, as will be explained, operator 38 may be set and reset by a push button arrangement.

Figure 2:
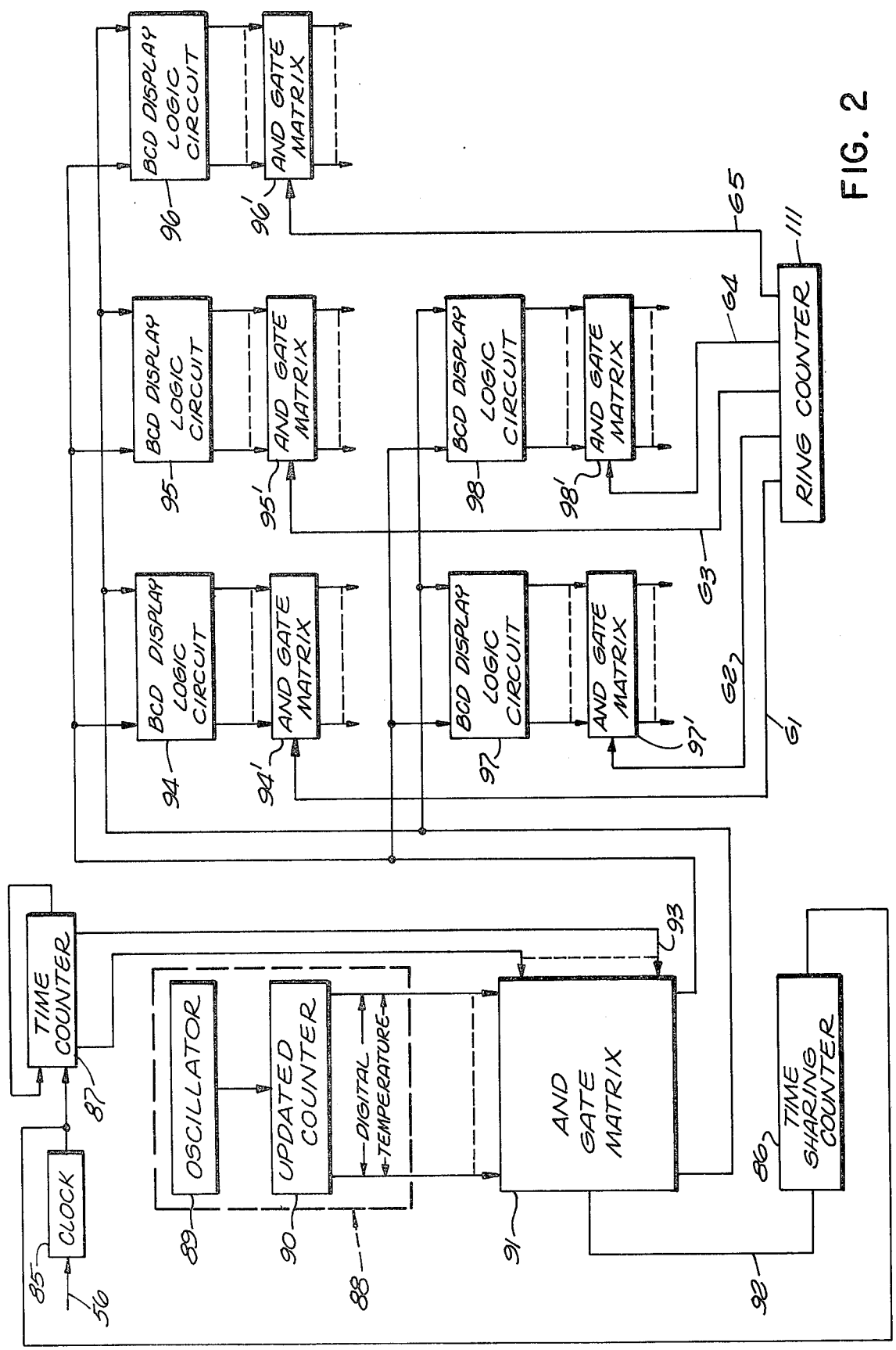
FIG. 2 is a block diagram of a portion of a switch operator shown in FIG. 1.

As shown in FIG. 2, lead 56 is connected to a clock 85. The output of clock 85 is impressed upon a time-sharing counter 86 and a time counter 87. Time ocunter 87 stores the time of day. A temperature source 88 is provided having a temperature-sensitive oscillator 89 which feeds an updated counter 90. The output of source 88 is digital and is directly proportional to the temperature in the space to be heated. The output of source 88 is impressed upon an AND gate matrix 91 having another input 92 from counter 86 and a set of inputs 93 from BCD logic circuits 94, 95, 96, 97 and 98 which contain the logic for the decimal digits on display 79 shown in FIG. 5 converted from the counter 87.

If clock 85 is simply a digital frequency multiplier, there is no need to make counter 87 correctable. The outputs of circuits 94 to 98 are impressed upon an OR gate matrix 110 in FIG. 4 through corresponding AND gates 94', 96', 95', 97' and 98' operated by the G1-G5 outputs of a ring counter 111 shown in FIG. 2.

In FIG. 2, counter 86 can, if desired, in relation to the frequency of the output of clock 85, divide the clock down so that when the "TIME AND TEMP" button 118 of FIG. 5 is depressed, the ambient temperature and time will be shown on display 79 at alternate times.

Counter 90 has one register that counts oscillator 89 for a fixed period of time and then transfers the count to another register.

Figure 3:
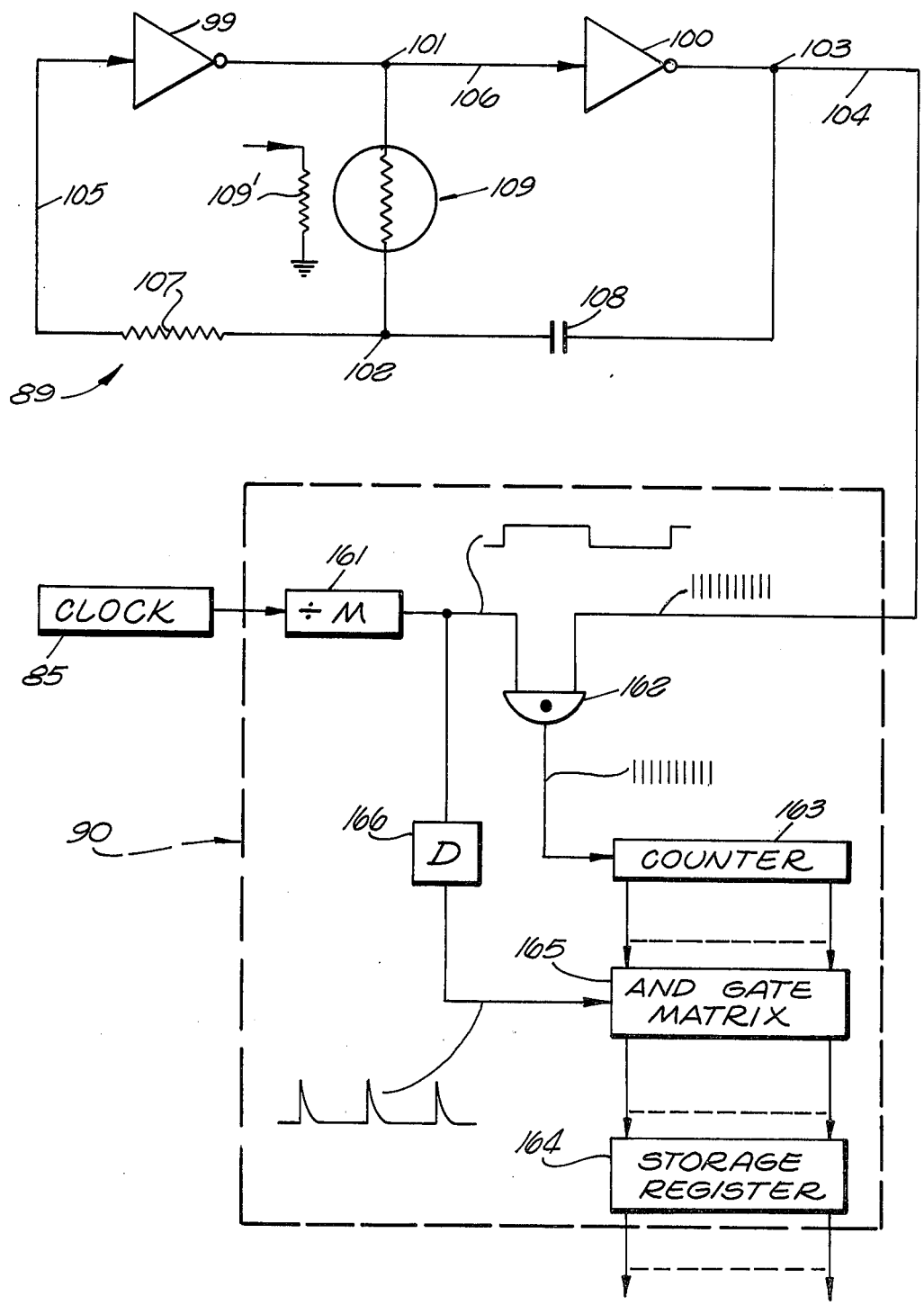
FIG. 3 is a schematic diagram of a temperature sensor shown in FIG. 2.

In FIG. 3, counter 90 of FIG. 2 is again shown. By itself, counter 90 is entirely conventional. A divider 161 produces a square wave during which groups of output pulses on lead 104 are counted at the output of AND gate 162. A counter 163 counts these pulses. The state of counter 163 is then transferred to a storage register 164 through an AND gate matrix 165 operated by the leading edge of the square wave output of divider 161 through a differentiator 166.

Oscillator 89 is shown in FIG. 3 including inverters 99 and 100. Junctions are provided at 101, 102 and 103. Oscillator 89 has an output lead 104 connected from junction 103. Inverter 99 has an input lead 105, and inverter 100 has an input lead 106. A resistor 107 is connected from junction 102 to lead 105. The output of inverter 99 is connected to junction 101. Lead 106 is connected from junction 101 to the input of amplifier 100. The output of amplifier 100 is connected to junction 103. A capacitor 108 is connected from junction 102 to junction 103. A thermistor 109 is provided connected from junction 101 to junction 102. Oscillator 89 produces an output frequency directly proportional to temperature. The output is quite linear. Thermistor 109 has a heat anticipator 109' that is connected from the output lead 158 of a gate 159 in FIG. 9, as will be explained. Thermistor 109 normally has a negative temperature coefficient of resistance. However, if desired, period rather than frequency may be related to a thermistor having a positive temperature coefficient of resistance. It is also possible to match Wheatstone bridge connected thermistors or one thermistor or other circuits with frequency-to-voltage or voltage-to-frequency converters with resistors having a linear temperature coefficient of resistance. Note will be taken that thermistor 109 has a non-linear temperature coefficient of resistance, but the frequency of the output of oscillator 89 is linear with temperature.

An oscillator, not necessarily temperature sensitive, of the type shown at 89 in FIG. 3 may be found in RCA publication "COS/MOS Integrated Circuits Manual," pages 91 and 92 (copyright 1972).

Figure 4:
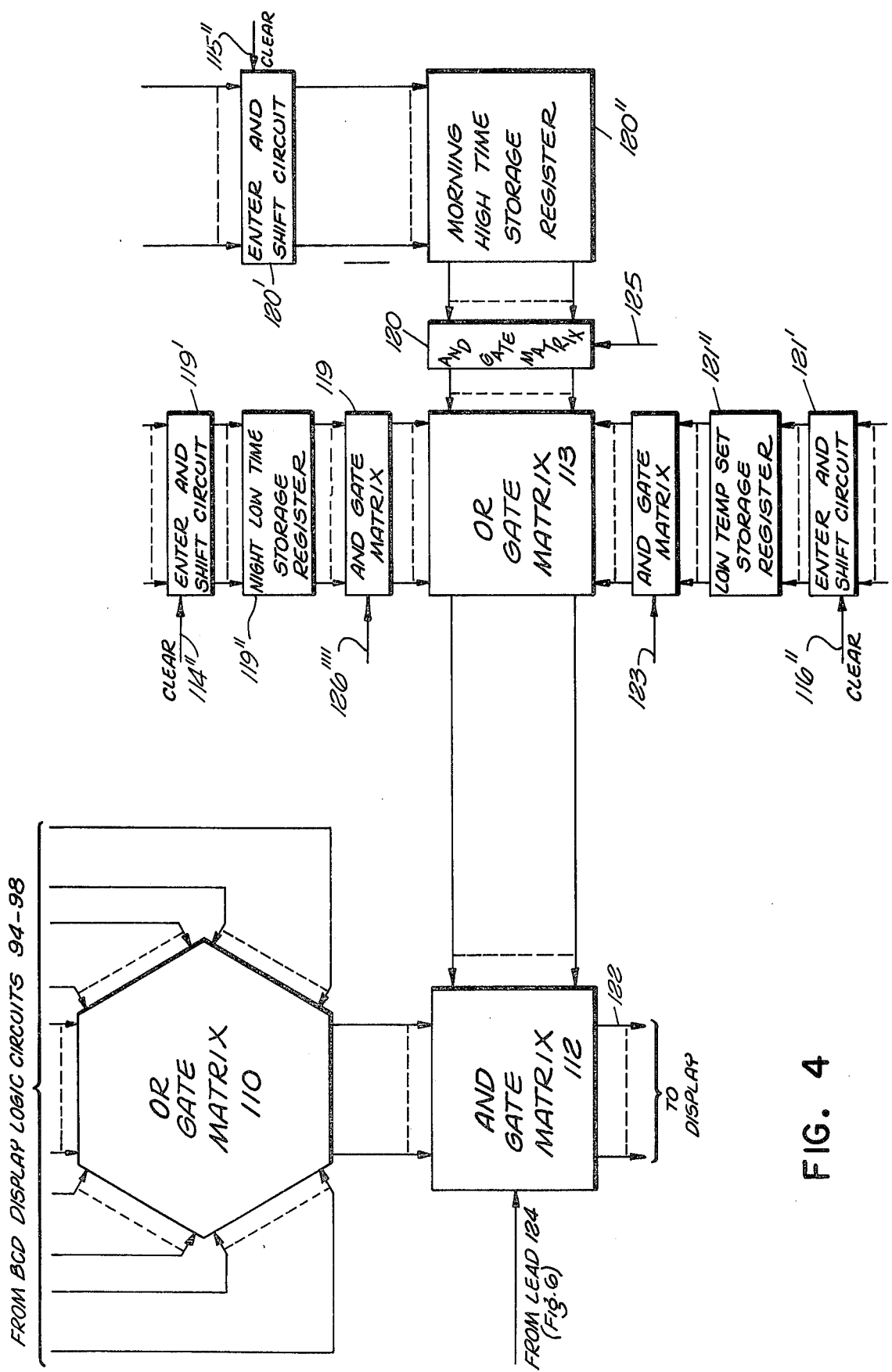
FIG. 4 is a block diagram of still other portions of the switch operator shown in FIG. 1.
Figure 6:
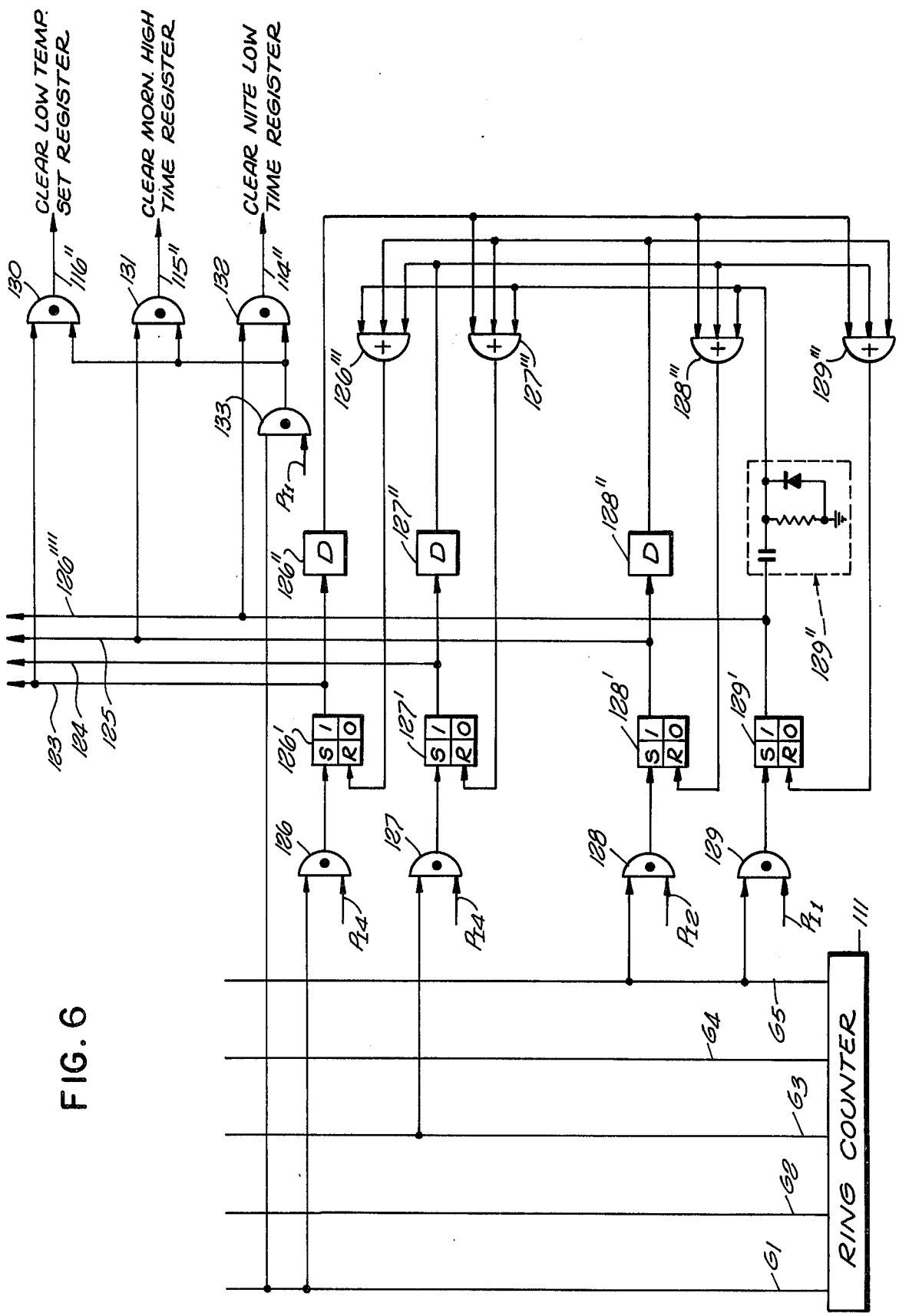
FIG. 6 is a block diagram of still other portions of the switch operator.

In FIG. 4, an AND gate matrix 112 connected from matrix 110 receives an operating signal over a lead 124 from FIG. 6.

Matrix 112 receives a set of inputs from an OR gate matrix 113 shown in FIG. 4, which matrix receives inputs via AND gate matrices 119, 120 and 121 from corresponding enter and shift circuits 119', 120' and 121', and registers 119'', 120'' and 121''. Register 119'' is a night low time storage register. Register 120'' is a morning high time storage register. Register 121'' is a low temperature set storage register. These registers are set through the respective enter and shift circuits 119', 120' and 121' connected from a push button assembly 117 with 20 push buttons 118 shown in FIG. 5. Circuits 119', 120' and 121' may be cleared by a connection from respective leads 114'', 115'' and 116'' shown in FIG. 6.

The enter and shift circuits 119', 120' and 121' may be conventional and operate in the manner that digits are entered in present-day desk calculators of the microprocessor type.

In FIG. 4, matrix 112 has a set of outputs 112 which are connected to display 79 shown in FIG. 5.

In FIG. 5, display 79 is entirely conventional and may be of a type manufactured by the Futaba Corporation. Each linear part 79' of each digit is a short, small tube which is illuminated when corresponding inputs 122 are supplied. However, ring counter 111 in effect supplies a strobe of, for example, 0.001 second to 0.01 second on each successive lead G to gate on only the group of tubes to be illuminated in each individual digit to be illuminated. A tube 123 has a corresponding input lead 122 which, when at an energizing potential, causes tube 123 to be illuminated and to indicate the time to be after noon and before midnight (P.M.).

Dots 124 and 125 can be illuminated all the time, if desired.

If desired, the two left-hand digits may alternately be employed to indicate temperature, whereas all the digits may be employed to indicate local time.

Assembly 117 simply connects one of the leads G to one of the leads PI.

The manner in which the gating leads previously described are provided is indicated in FIG. 6. The PI inputs to AND gates 126, 127, 128 and 129 shown in FIG. 6 impress high inputs thereon when corresponding PI push buttons 118 are depressed and a certain G strobe occurs. Corresponding flip-flops 126', 127', 128' and 129' are thus set depending upon which of the G outputs of ring counter 111 is connected to the corresponding AND gates 126 to 129. The "1" outputs of flip-flops 126', 127', 128' and 129' are, respectively, 123, 124, 125 and 126''''. Each of AND gates 130, 131 and 132 receive the output of an AND gate 133. AND gate 133 receives a G1 input and a PI1 input. AND gates 130, 131 and 132 receive inputs from leads 123, 125 and 126'''', respectively. Three of the four flip-flops 126' to 129' are always reset by the output of the fourth through differentiators 126'', 127'', 128'' and 129''. Thus, three inputs are provided to each of four OR gates 126''', 127''', 128''' and 129'''.

Figure 7:
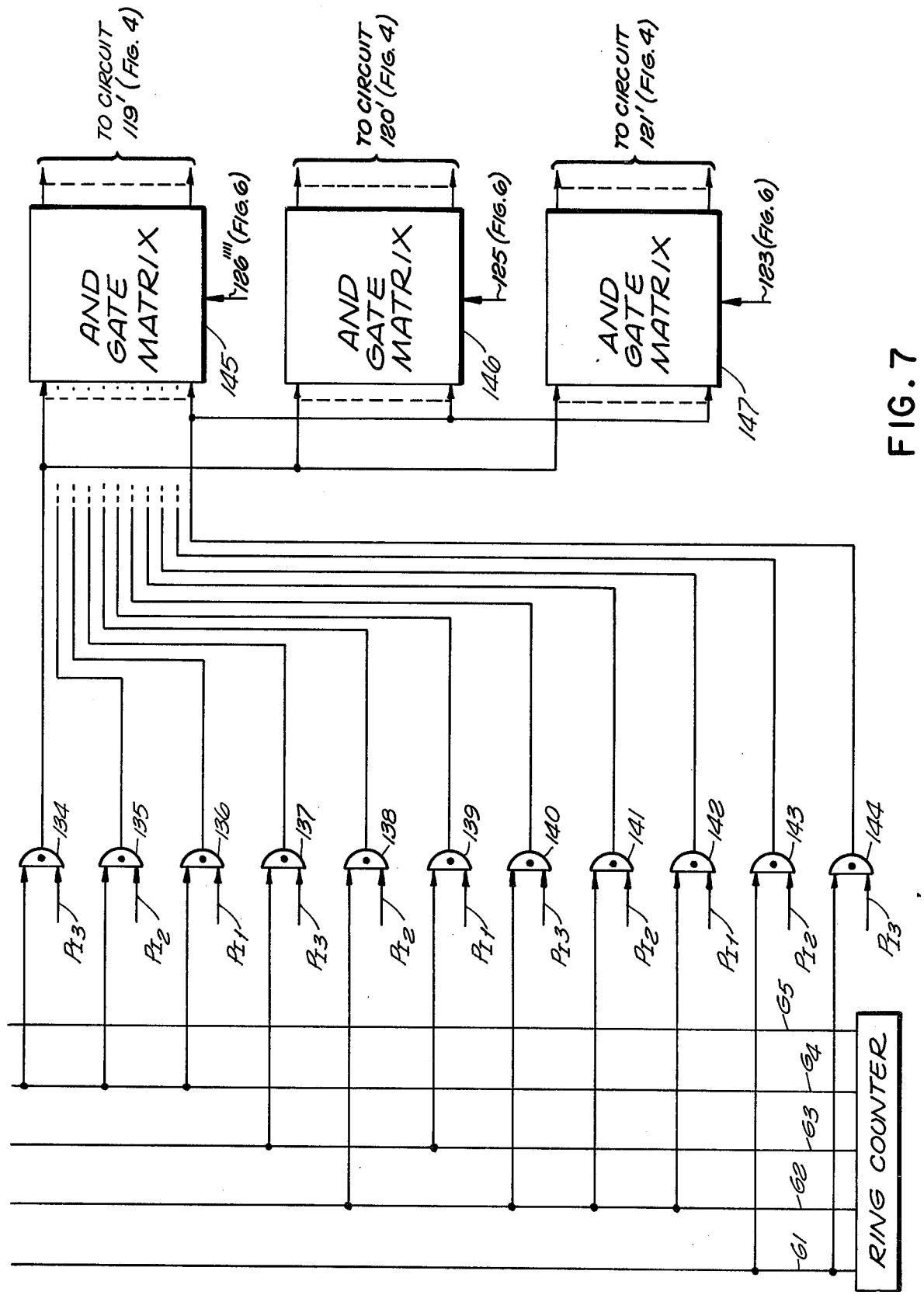
FIG. 7 is a block diagram of still other portions of the switch operator.

In FIG. 7, ring counter 111 with AND gates 134, 135, 136, 137, 138, 139, 140, 141, 142, 143 and 144 impress, as each push button 118 in FIG. 5 is depressed, decade digits 9, 8, 7, 6, 5, 4, 3, 2, 1 and PM, respectively.

The outputs of AND gates 134 to 144 are impressed upon each of three AND gate matrices 145, 146 and 147 having control inputs on leads 126'''', 125 and 123, respectively.

Figure 8:
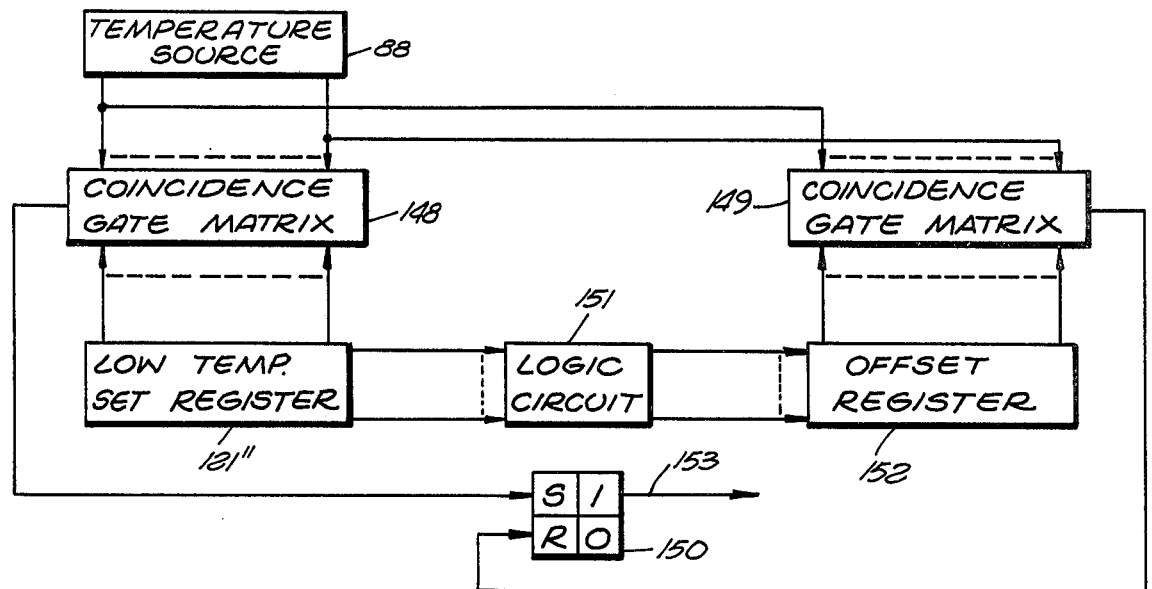
FIG. 8 is a block diagram of apparatus for turning the thermostat on and off at different temperatures which are nearly the same.

The output of temperature source 88 shown in FIG. 2 is also shown in FIG. 8. The output thereof is impressed upon coincidence gate matrices 148 and 149. Register 121'' shown in FIGS. 4 and 8 thus carries the low temperature which is set therein and compared with the ambient temperature carried by source 88. The output of matrix 148 then sets a flip-flop 150. Matrix 149 resets flip-flop 150. A logic circuit 151 then connects register 121'' with an offset register 152. Offset register 152 carries the temperature of register 121'' plus 1 degree. The circuit of FIG. 8 is thus a hysteresis circuit. When ambient temperature falls below that set in register 121'', as will be explained, switch 31 shown in FIG. 1 is turned on. If ambient temperature rises above that set in register 152, the switch 31 is turned off. The output lead of flip-flop 150 is indicated at 153 in both FIG. 8 and FIG. 9.

Figure 9:
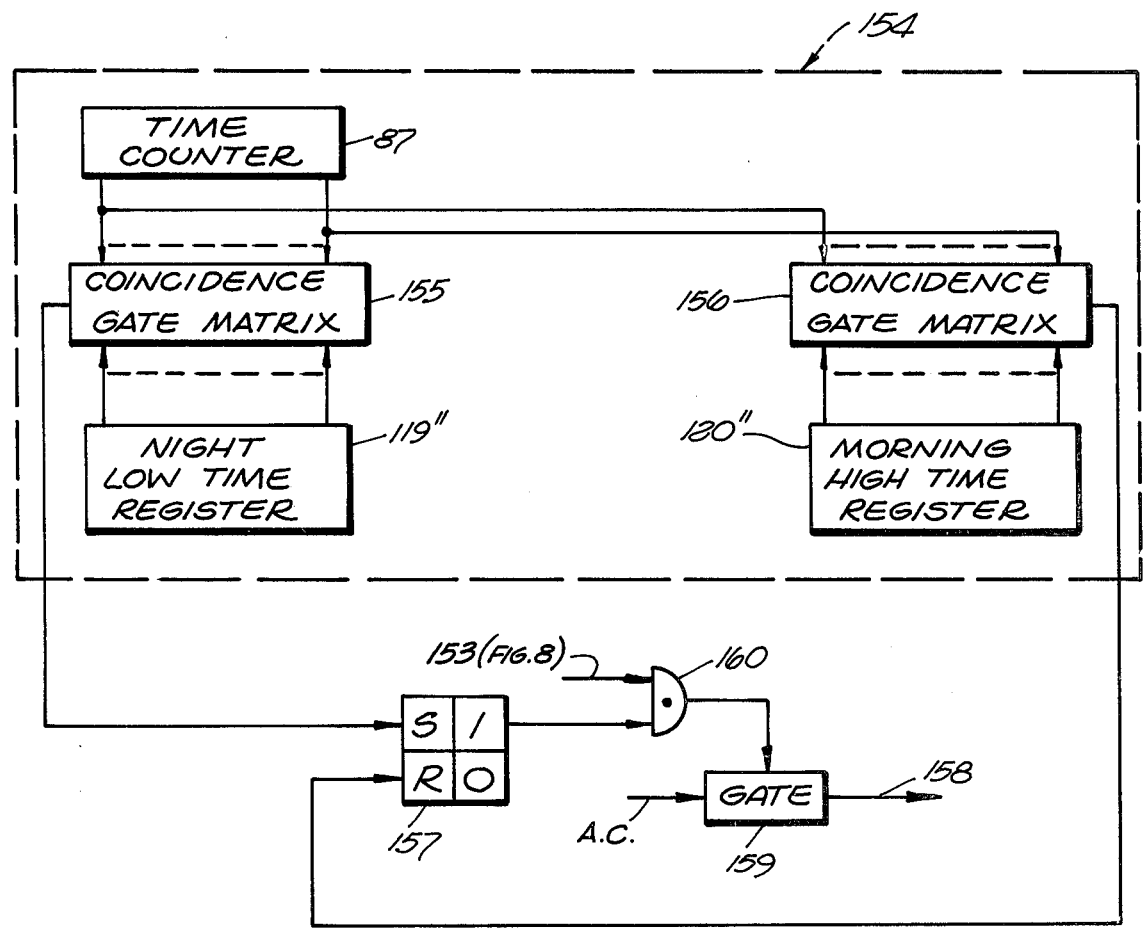
FIG. 9 is a block diagram employed in the switch operator for controlling the switch logic at two different times during the day.

The apparatus shown in FIG. 9 provides the time conditions. The control is indicated at 154. This includes counter 87 which is connected to coincidence gate matrices 155 and 156. Matrices 155 and 156 also have two sets of inputs, respectively, from registers 119'' and 120''. Matrix 155 thus sets a flip-flop 157 and the output 158 of gate 159 is connected to gate 34 of switch 31 in FIG. 1 to operate the same when the output of an AND gate 160 is high. Note will be taken that it is only high when the "1" output of flip-flop 157 in FIG. 9 and the "1" output of flip-flop 150 in FIG. 8 are both high.

In FIG. 2, clock 85 drives both counter 87 and counter 86. Counter 86 is simply a divider which operates matrix 91. Source 88 is shown in both FIGS. 2 and 3. The output of source 88 is digital and is proportional to ambient temperature. Matrix 91 thus, through matrices 110 and 112 in FIG. 4, presents temperature and time alternately to display 79 in FIG. 5, provided that the signal on lead 124 in FIG. 6 is of an appropriate magnitude. See the lead 124 in FIG. 4. Otherwise, the set of leads 122 in FIG. 4 and in FIG. 5 is connected to one and only one of the registers 119'', 120'' or 121''. The current time and ambient temperature are alternately displayed by the gating of counter 86 in FIG. 2 by depressing the button 118 labeled "TIME AND TEMP." in FIG. 5. As can be seen from FIG. 5, this operation will connect lead G3 to lead PI4. In turn, flip-flop 127' in FIG. 6 will be set and a high output signal will appear on lead 124 thereof. This will operate matrix 112 (FIG. 4) to allow the information from matrix 110 to pass therethrough, but not that from matrix 113.

If it is desired that the night low time be set, by use of assembly 117, a button 118 in FIG. 5 is depressed connecting lead G5 to lead PI1. This sets flip-flop 129' in FIG. 6 and supplies a high output voltage on lead 126'''', allowing the output of register 119'' to pass through OR gate matrix 113 as shown in FIG. 4. The stored time will appear in display 79 until cleared by pressing the "CLEAR" button 118 shown in FIG. 5. By doing so, lead G1 is connected to lead PI1, and the output of AND gate 133 in FIG. 6, with the high output of lead 126'''', will clear circuit 119'.

In FIG. 7, AND gate matrices 145, 146 and 147 selectively place AND gates 134-144 in communication with circuits 199', 120' and 121', respectively, because leads 126'''', 125 and 123 are selectively and respectively turned high.

An old morning high time and the low temperature set may be similarly cleared and a new one entered in registers 120'' and 121'', respectively. For example, the morning high time button 118 shown in FIG. 5 connects lead G5 to lead PI2, which sets flip-flop 128' shown in FIG. 6 and places a high voltage on lead 125. See 125 at an input of matrix 146 in FIG. 7.

For the low temperature set, lead G1 is connected to lead PI4 and flip-flop 126' is set. The voltage on lead 123 will then be high, and register 121'' may be set. See input lead 123 to matrix 147 in FIG. 7.

After any of the registers 119'', 120'' and 121'' in FIG. 4 is set, display 79 may be turned to its alternate time and temperature indication by depressing the time and temperature button 118 shown in FIG. 5.

The digital number represented by the potentials of leads 122 in FIG. 5 is synchronized with counter 111. Each digit does not appear in display 79 until a pulse is generated on the particular one of the leads G. However, the repetition rate of the pulses is so great that there is no flicker visible to the human eye.

Operation (FIGS. 1–9)

Operation of the embodiment of FIGS. 1–9 is as follows:

In FIG. 1, triac 31 is effectively a "switch" which opens and closes depending upon the magnitude of the signal on gate 34. Triac 31 (leads 32 and 33) and switch 28 are connected in series from lead 25 with lead 33 being connected to lead 26 via junction 35, lead 36, junction 75, winding 37, and junction 83. In other words, winding 37 is connected in series with "switches" 31 and 28 between leads 25 and 26.

Thermostat 27 may be entirely conventional. The adjustable position of knob 30 of thermostat 27 determines the set point of the daytime temperature. It is possible for switch 28 to control the daytime temperature because the triac "switch" 31 between leads 22 and 33 is closed "all day" by operator 38 (between the "MORN HIGH TIME" and the "NITE LOW TIME"). After the "NITE LOW TIME" and until morning again, operator 38 (FIG. 1) controls triac "switch" 31 to reduce the temperature to the "LOW TEMP" set in FIG. 5. This can be done because the triac "switch" 31 (FIG. 1) overrides switch 28. Note that if the triac switch 31 provides an opening between leads 32 and 33, the temperature will cool down in spite of thermostat 27 and switch 28 will remain closed after "NITE LOW TIME" and until "MORN HIGH TIME" is reached.

FIG. 1 may be tied in with FIGS. 2–9 in that FIGS. 2–9 are included only in operator 38 of FIG. 1. Lead 56 in FIG. 1 is the same lead 56 in FIG. 2. Lead 59 in FIG. 1 is simply a power input lead to operator 38. It is therefore not otherwise shown.

The lead 158 shown in FIG. 9 is connected to gate 34 of triac switch 31 shown in FIG. 1, as stated previously, via lead 39.

The Embodiment of FIGS. 10–15

Figure 10:
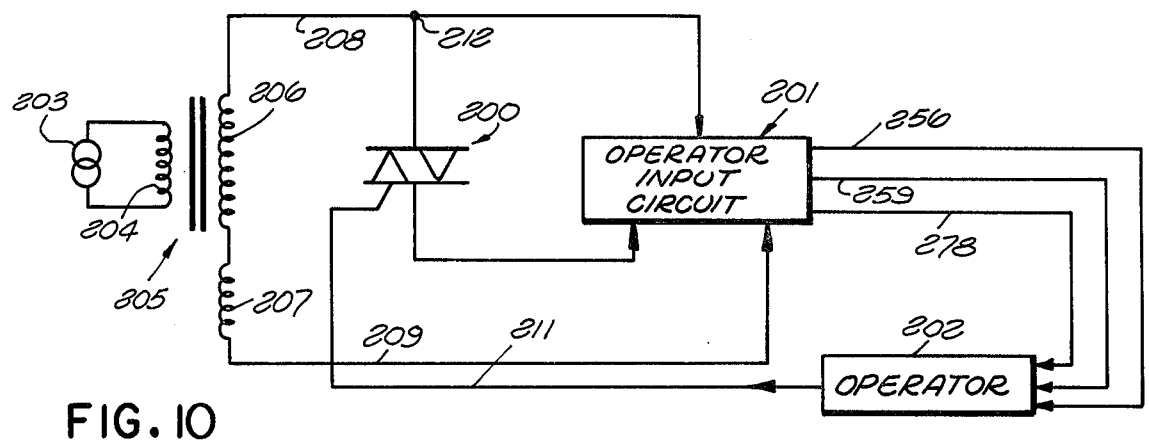
FIG. 10 is a block diagram of an alternative embodiment of the present invention.

In accordance with the present invention, the same or more functions illustrated in FIG. 1 may be performed by a single switch, viz. a triac 200 shown in FIG. 10. An operator input circuit 201 is also provided which may be identical to circuit 40 shown in FIG. 1. An operator 202 is shown in FIG. 10 which must be different from but may be similar to operator 38 shown in FIG. 1.

An A.C. source 203 is shown in FIG. 10 connected across the primary 204 of a transformer 205 having a winding 206 connected in series with a main valve winding 207 between leads 208 and 209.

As before, triac 200 is provided with a gate 210 connected from the output of operator 202 via a lead 211. Lead 208 is connected to circuit 201 through a junction 212. Triac 200 is connected from junction 212 to circuit 201. Circuit 201 has output leads 256, 259 and 278 which may be identical to leads 56, 59 and 78 shown in FIG. 1.

Figure 11:
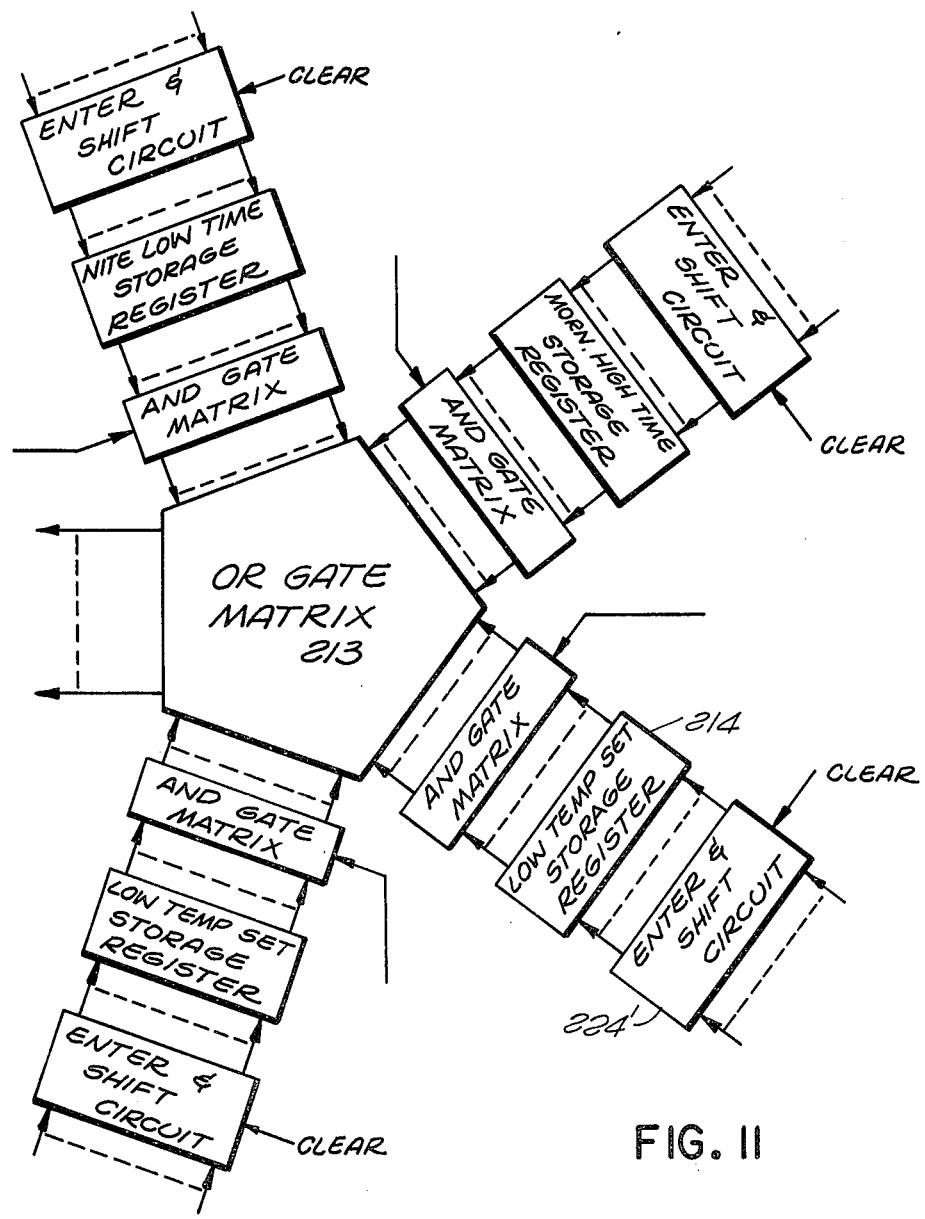
FIGS. 11, 12, 13, 14 and 15 are block diagrams which may be employed in a switch operator shown in FIG. 10.

Operator 202 may include structure identical to that shown in FIG. 4 except that matrix 213 in FIG. 11 has four sets of inputs, whereas matrix 113 in FIG. 4 has only three sets of inputs. A register 214 has been added in FIG. 3 so that the high temperature may be set.

Figure 12:
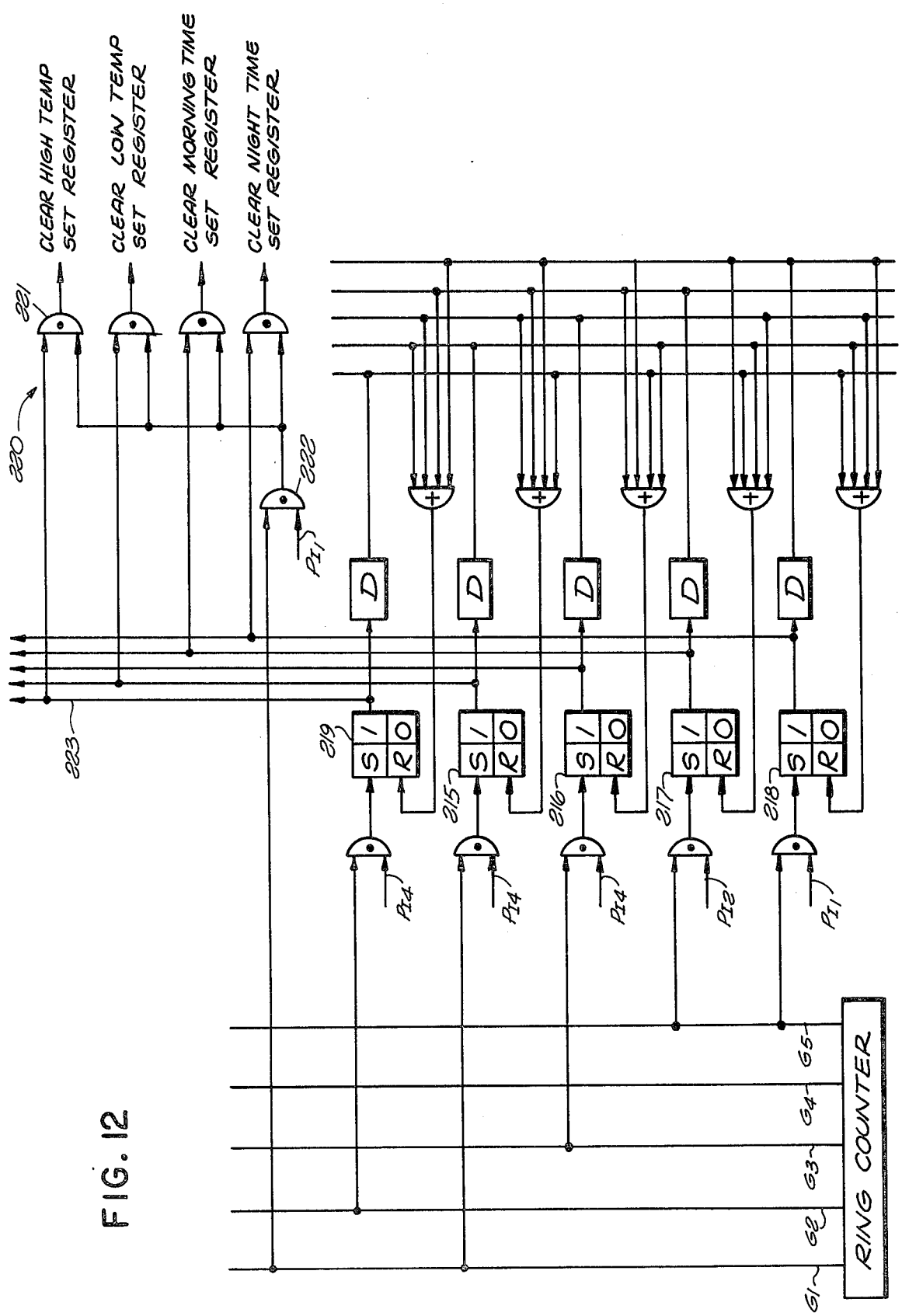

In FIG. 12, some additional logic is required for the control. Comparison of FIG. 6 with FIG. 12 will reveal that, except for the additional reset logic, flip-flops 215, 216, 217 and 218 and the logic thereof are identical to those of flip-flops 126', 127', 128' and 129', respectively.

Flip-flop 219 in FIG. 12 simply provides storage for setting or resetting register 214 shown in FIG. 11. The clear outputs of FIG. 12 indicated at 220 have only been expanded to provide for an additional AND gate 221 connected from AND gate 222 which may be identical to AND gate 133 in FIG. 6. The logic of AND gate 221 in FIG. 12 is thus the output of AND gate 222 and the potential of a lead 223' connected from the "1" output of flip-flop 219.

Figure 13:
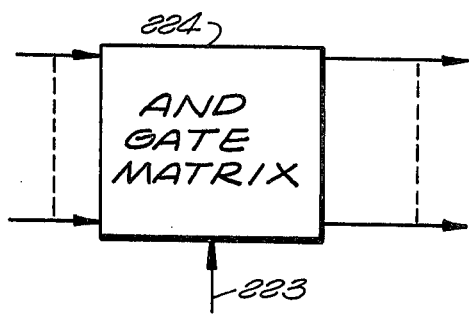

An AND gate matrix 224 is shown in FIG. 13 to demonstrate that it is needed in the embodiment of FIGS. 10–15 in connection with FIG. 7 to receive an input from AND gates 134 to 144 and to have a control connection from lead 223 shown in FIG. 12. The output of matrix 224 is, as before, then connected to the input of an enter and shift circuit 224 shown in FIG. 11.

Figure 14:
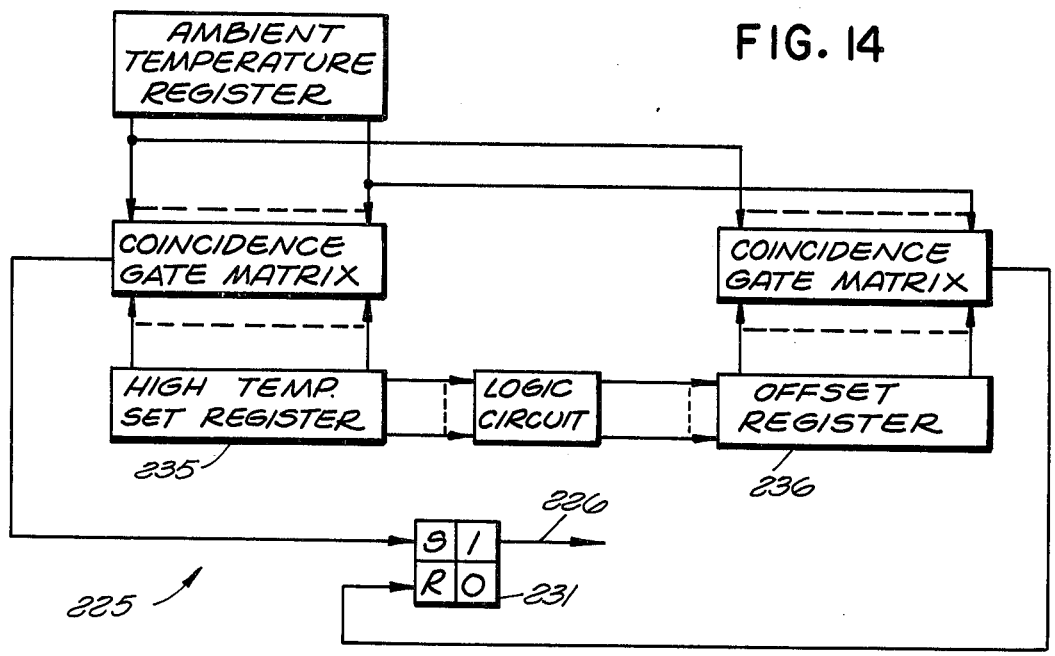

For the embodiment of FIGS. 10–15, a temperature control circuit the same as or similar to a circuit 225 shown in FIG. 14 is required. Note will be taken that the circuit 225 may be identical to that shown in FIG. 8, except that two such circuits are required. That is, the circuit of FIG. 14 must be employed with the circuit of FIG. 8 in order to accomplish the purposes of the embodiment of FIGS. 10–15.

The output of circuit 225 is illustrated at 226 in FIG. 14.

Figure 15:
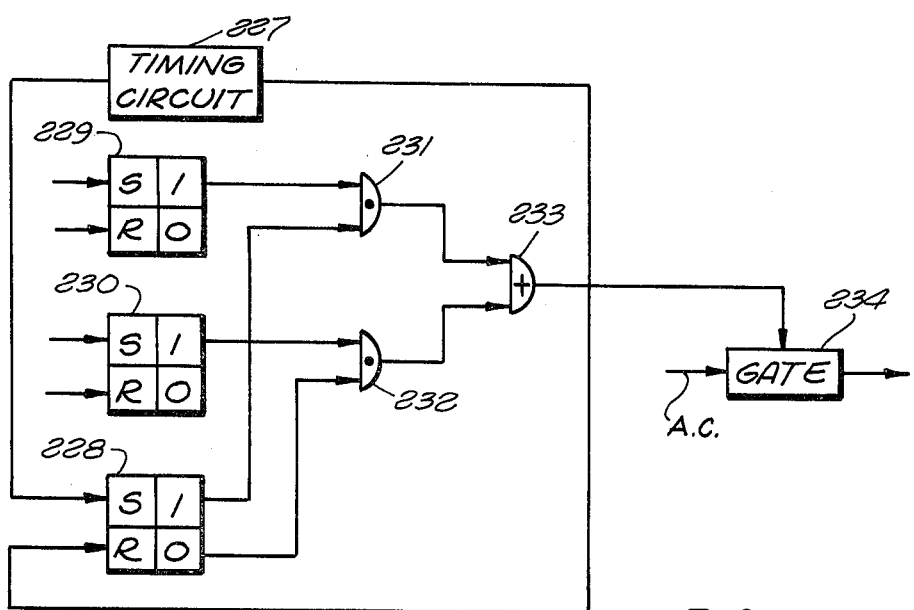

The outputs of the various circuits are then combined as shown in FIG. 15. In FIG. 15, a timing circuit is provided at 227 which is identical to circuit 154 shown in FIG. 9. A flip-flop 228 shown in FIG. 15 may be identical to flip-flop 157 shown in FIG. 9.

If, when the "1" of flip-flop 228 is high, it is nighttime, then the flip-flop 229 is that corresponding to flip-flop 150 in FIG. 8. Further, a flip-flop 230 is shown in FIG. 15 which may be identical to a flip-flop 231 shown in FIG. 14.

Operation (FIGS. 10–15)

The logic of AND gates 231 and 232, the logic of OR gate 233, and the logic of a gate 234 is then as follows.

When the "1" output of flip-flop 228 in FIG. 15 is high, this indicates that it is nighttime. Thus, only the output of AND gate 231 can open gate 234 and allow switch 200 to close. The switch will close or will open depending upon whether the output of the low temperature flip-flop 229 is high or not.

Similarly, when the "0" output of flip-flop 228 is high, only the high temperature set in register 235 shown in FIG. 14 can control the on time of gate 234, and the offset register 236 control the off time thereof.

What is claimed is:

1. A heating system comprising: a first series circuit including a power source and main winding connected in series; a two-wire line connected from each end of said first series circuit; a transformer including a primary and a secondary, said primary having first and second ends; a second series circuit, said second series circuit including first and second thermostatic switches connected in series from one line lead to said primary first end, said primary second end being connected to the other line lead; a first adjustable operator responsive to ambient temperature to close said first switch when ambient falls approximately below a predetermined high set temperature, and to open said first switch when ambient rises approximately above said predetermined high set temperature; a time-of-day source to produce first and second time output signals at first and second predetermined set times, respectively; a second operator also responsive to ambient temperature to close said second switch when ambient falls approximately below a predetermined low set temperature during a first time period after said first time output signal and before said second time output signal, said second operator opening said second switch during said first time period when ambient rises approximately above said predetermined low set temperature, said second operator closing said second switch all day except during said first time period; means connected from said secondary to said second operator for supplying a voltage thereto; and an auxiliary power supply circuit connected from said line, said first and second switches, when both are closed, then and only then short circuiting said auxiliary power supply circuit, said primary always being supplied power, viz. from said power source when both of said first and second switches are closed, and from said auxiliary power supply circuit when at least one of said first and second switches is open.

2. The invention as defined in claim 1, wherein one end of said first switch is connected from said one lead of said line, and a lead of said second switch being connected to said primary first end, said second operator having a D.C. element with a first end connected to said primary first end, said D.C. element having a second end, a first diode connected from said primary second end to said D.C. element second end, said auxiliary power supply circuit being connected from said one lead to said primary first end and to said D.C. element second end to supply a pulsating D.C. to said primary when at least one of said first and second switches is open.

3. A heating system comprising: a first series circuit having first and second ends and including a power source and main winding connected in series; first and second leads connected respectively to the first and second ends of said first series circuit; a second series circuit, said second series circuit including first and second thermostatic switches connected in series from said first lead to said second lead; a first operator responsive to ambient temperature to close said first switch when ambient falls approximately below a predetermined high set temperature, and to open said first switch when ambient rises approximately above said predetermined high set temperature; a time-of-day source to produce first and second time output signals at first and second predetermined set times, respectively; and a second operator also responsive to ambient temperature to close said switch when ambient falls approximately below a predetermined low set temperature during a first time period after said first time output signal and before said second time output signal, said second operator opening said second switch during said first time period when ambient rises approximately above said predetermined low set temperature, said second operator closing said second switch all day except during said first time period, said second operator including first, second and third registers, said first register being a night low time storage register, said second register being a morning high time storage register, said third register being a low temperature set storage register, resettable means to set said first, second and third registers to said first and second times and to said predetermined low set temperature, respectively, said second operator including means for comparing the contents of said time-of-day source with that of said first and second registers to produce said first and second time output signals, first means to store said first and second time output signals, first means to store said first and second time output signals, sensor means including a fourth register to store ambient temperature, second means for comparing the contents of said third and fourth registers, and third means responsive to the outputs of said first and second means to control the opening and closing of said second switch.

4. A heating system comprising: a first series circuit having first and second ends and including a power source and a main winding connected in series; first and second leads connected respectively to the first and second ends of said first series circuit; a second series circuit, said second series circuit including a thermostatic switch connected in series from said first lead to said second; a time-of-day source to produce first and second time output signals at first and second predetermined set times, respectively; an operator responsive to ambient temperature to close said switch when ambient falls to a level approximately below a predetermined high set temperature during a period after said second predetermined set time and before said first predetermined set time, and to open said first switch when ambient rises to a level approximately above said predetermined high set temperature during said period; said operator also being responsive to ambient temperature to close said switch when ambient falls to a level approximately below a predetermined low set temperature during another period after said first time and before said second time, and to open said switch when ambient rises to a level approximately above said predetermined low set temperature during said other period; and control means including a plurality of decimal momentary contact switches, said control means being actuable to set any of said times and temperature with the said self-same decimal switches.

5. A heating system comprising: a first series circuit having first and second ends and including a power source and a main winding connected in series; first and second leads connected respectively to the first and second ends of said first series circuit; a second series circuit connected between the ends of said first series circuit, said second series circuit including a switch connected in series between said leads; a time-of-day source to produce first and second time output signals over first and second predetermined time periods; a resettable upper low temperature (ULT) register; a resettable lower low temperature (LLT) register; a resettable upper high temperature (UHT) register; a resettable lower high temperature (LHT) register; an ambient temperature (AT) register; and comparator means connected from all of said registers and said time-of-day source to said switch to open and to close said switch, said comparator means closing said switch during said first period when the contents of said AT register is less than that of said LLT register, said comparator means also closing said switch during said second period when the contents of said AT register is less than that of said LHT register, said comparator means opening said switch during said first period when the contents of said AT register is greater than that of said ULT register, said comparator means opening said switch during said second period when the contents of said AT register is greater than that of said UHT register.

* * * * *